(12) United States Patent
Lee

(10) Patent No.: US 9,395,703 B2
(45) Date of Patent: Jul. 19, 2016

(54) MULTISTAGE CONTROL METHOD OF FLOW CONTROL VALVE USING DC MOTOR

(75) Inventor: Joong Youp Lee, Daejeon (KR)

(73) Assignee: KOREA AEROSPACE RESEARCH INSTITUTE, Daejeon (KR)

( * ) Notice: Subject to any disclaimer, the term of this patent is extended or adjusted under 35 U.S.C. 154(b) by 219 days.

(21) Appl. No.: 13/822,008

(22) PCT Filed: Aug. 24, 2012

(86) PCT No.: PCT/KR2012/006756
§ 371 (c)(1),
(2), (4) Date: Mar. 11, 2013

(87) PCT Pub. No.: WO2013/028027
PCT Pub. Date: Feb. 28, 2013

(65) Prior Publication Data
US 2013/0175968 A1    Jul. 11, 2013

(30) Foreign Application Priority Data

Aug. 24, 2011    (KR) .................. 10-2011-0084265

(51) Int. Cl.
| G05B 11/01 | (2006.01) |
| G05B 11/18 | (2006.01) |
| F02K 9/56  | (2006.01) |
| F02K 9/58  | (2006.01) |
| F02K 9/80  | (2006.01) |

(52) U.S. Cl.
CPC . *G05B 11/18* (2013.01); *F02K 9/56* (2013.01); *F02K 9/58* (2013.01); *F02K 9/80* (2013.01)

(58) Field of Classification Search
USPC ............ 318/560, 162, 163, 164, 400.12, 595, 318/690
See application file for complete search history.

(56) References Cited

U.S. PATENT DOCUMENTS

| 4,763,560    | A  * | 8/1988  | Sasaki ............................ 91/364 |
| 7,215,499    | B1 * | 5/2007  | Li et al. .......................... 360/75 |
| 2007/0046222 | A1 * | 3/2007  | Lindsey ......................... 318/254 |
| 2009/0008196 | A1 * | 1/2009  | Suzuki et al. ................. 188/285 |
| 2010/0264983 | A1 * | 10/2010 | Nation et al. ................. 327/540 |

FOREIGN PATENT DOCUMENTS

| JP | 2005-012975 A |   | 1/2005  |
| JP | 2005012975  A | * | 1/2005  |
| JP | 2007-255583 A |   | 10/2007 |
| JP | 2007255583  A | * | 10/2007 |

* cited by examiner

*Primary Examiner* — Eduardo Colon Santana
*Assistant Examiner* — Iftekhar Mustafa
(74) *Attorney, Agent, or Firm* — Rabin & Berdo, P.C.

(57) ABSTRACT

A multistage control method of a flow rate control valve which is opened or closed when a DC motor rotates. The method includes dividing angular speed limit areas of the DC motor depending on stages based on limit values so that angular speed values of the DC motor are to be scheduled depending on the stages and controlling the DC motor to rotate at a determined angular speed value depending on a corresponding angular speed instruction to the DC motor within one angular speed limit area. When the angular speed value of the DC motor is outside a limit value of the corresponding angular speed limit area, the DC motor rotates at a determined angular speed value until reaching outside a limit value of the corresponding limit area depending on a corresponding angular speed instruction to the DC motor within an angular speed limit area of the next stage.

2 Claims, 2 Drawing Sheets

MULTISTAGE CONTROL METHOD OF FLOW CONTROL VALVE USING DC MOTOR

TECHNICAL FIELD

The present invention relates, in general, to a multistage control method of a flow rate control valve using a direct current (DC) motor and, more particularly, to a multistage control method of a flow rate control valve using a DC motor which sets suitable limit values depending on stages according to angular speed components of a DC motor depending on a drive voltage that is applied during angular speed control over the DC motor, and executes speed control over the DC motor within a corresponding limit range, so that a target value can be rapidly reached without an overshoot or an undershoot and the DC motor can be rotated at an intended angular speed, thereby enabling precise control of a flow rate.

BACKGROUND ART

Stable output control of a liquid rocket engine is one of the main methods that countries who have advanced rocket technologies use in order to launch a payload of a rocket into a target orbit. In particular, a projectile which uses a liquid propellant reduces the thrust of a propulsion engine in order to maintain the thrust depending on a designed mission flight or to ensure a safe stage separation. For this purpose, active control is carried out using a control valve instead of a fixed orifice in order to maintain and fix the flow rate of the propellant to be constant depending on a preset value of thrust.

A typical industrial control valve which is used for such active control is configured such that it uses a pneumatic actuator which requires a large amount of force and its weight is increased by periphery devices which are used for control, which is problematic when the valve is applied to a liquid rocket engine for aviation.

In the meantime, as demand for satellites is rapidly increasing due to various communication needs or the like, countries having advanced technologies in aerospace fields, such as the USA, Russia, European countries and Japan, are acquiring liquid rocket technologies with which a large satellite can be launched into an intended orbit. The acquirement of the technology for precisely controlling a complicated propulsion system, i.e. properly controlling the mass of a propellant and a thrust depending on the orbit of a liquid rocket, is indispensable for the development of liquid rockets.

In such a liquid rocket, thrust reduction is carried out for the purpose of separation between stages and protection of a payload. During the thrust reduction, the thrust is uniformly adjusted to prevent any problems from occurring in the liquid rocket. In the case of a liquid rocket, this object can be realized by controlling the flow rate of a liquid that is consumed in order to adjust the thrust. Consequently, countries having advanced technologies for projectiles control a flow rate valve of a liquid rocket using an algorithm that they have developed themselves. However, no such technologies are known in the Republic of Korea.

Accordingly, the present invention is intended to propose a multistage control method of a flow rate control valve using a DC motor which can precisely control a flow rate by rotating the DC motor at an intended angular speed.

DISCLOSURE

Technical Problem

Accordingly, the present invention has been made keeping in mind the above problems occurring in the related art, and is intended to provide a multistage control method of a flow rate control valve using a direct current (DC) motor which sets suitable limit values depending on stages according to angular speed components of a DC motor depending on a drive voltage that is applied during angular speed control of the DC motor, and executes speed control over the DC motor within a corresponding limit range, so that a target value can be rapidly reached without an overshoot or an undershoot and the DC motor can be rotated at an intended angular speed, thereby enabling precise control of a flow rate.

Technical Solution

In an aspect, the present invention provides a multistage control method of a flow rate control valve which is opened or closed when a direct current (DC) motor rotates so that a flow rate is adjusted. The multistage control method includes dividing angular speed limit areas of the DC motor depending on stages based on a plurality of limit values (SP1, SP2, SP3, SP4, ...) so that angular speed values of the DC motor that are determined depending on drive voltages applied to the DC motor are to be scheduled depending on the stages and controlling the DC motor to rotate at a determined angular speed value depending on a corresponding angular speed instruction (Sn) to the DC motor within one angular speed limit area, in which, when the angular speed value of the DC motor is outside the range of a limit value (SPn) of the corresponding angular speed limit area, the DC motor is controlled so as to rotate at a determined angular speed value until reaching outside the range of a limit value (SPn+1) of the corresponding limit area depending on a corresponding angular speed instruction (Sn+1) to the DC motor within an angular speed limit area of a next stage.

Here, the sizes of the plurality of limit values (SP1, SP2, SP3, SP4, ...) may be set within the range in which neither an overshoot nor an undershoot occurs depending on rotational characteristics of the DC motor.

Advantageous Effects

According to the present invention as described above, first, suitable limit values are set depending on stages according to angular speed components of the DC motor depending on a drive voltage that is applied during angular speed control of the DC motor using a speed control method and the speed of the DC motor is controlled within a corresponding limit range. Consequently, it is possible to rapidly reach a target value without an overshoot or an undershoot, so that the DC motor can be rotated at an intended angular speed, thereby enabling the effect of precise flow rate control. In addition, there is an advantage in that the adjustment result is linear, since a one-directional instruction is given depending on the limit value of the angular speed of the DC motor.

Second, since the maximum and minimum angular speeds can be set freely, it is possible to properly control the flow rate of an apparatus, such as a liquid rocket, the thrust of which must be changed into a low thrust level after being maintained at a constant level.

Third, since the angular speed is determined depending on a drive voltage applied to the DC motor, the speed of the DC motor is controlled by dividing and scheduling the angular speed value of the DC motor that is already known into several limit values depending on stages. Therefore, additional tuning for speed control is unnecessary, which is advantageous.

Fourth, the speed control of the DC motor using the speed control method can use a variety of speed components (limit values) corresponding to target values. That is, an appropriate target value can be set based on information about the angular speed of the DC motor that is already known and by calculating the reduction ratio of gears.

Fifth, a flow rate control method using a hydraulic or pneumatic actuator has problems in that a system is complicated because a hydraulic or pneumatic system is required and the hydraulic or pneumatic system must also be modified when the design is changed. In contrast, when an electric motor actuator, such as the DC motor, is used as described above, a driving mechanism is simple and the design can be freely changed by an electrical adjustment such as an adjustment in a voltage.

MODE FOR INVENTION

Figure 1:
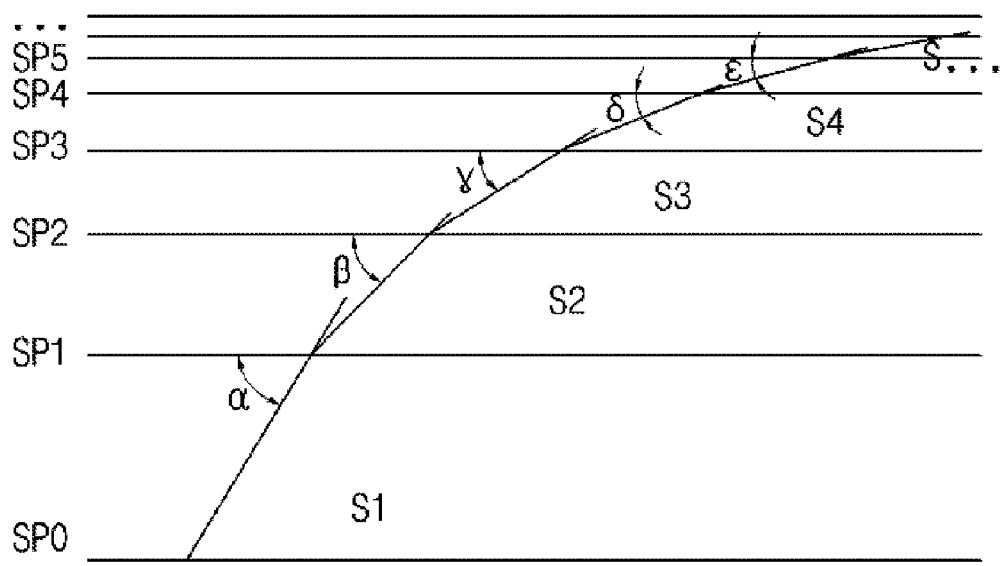
FIG. 1 is a conceptual view showing an operation principle of a multistage control method of a flow rate control valve using a direct current (DC) motor according to an exemplary embodiment of the invention.

Hereinbelow, preferred embodiments of the present invention will be described in detail with reference to the accompanying drawings. First of all, the terminologies or words used in the description and the claims of the present invention should not be interpreted as being limited merely to common and dictionary meanings. On the contrary, they should be interpreted based on the meanings and concepts of the invention in compliance with the scope of the invention on the basis of the principle that the inventors can appropriately define the terms in order to describe the invention in the best way.

Therefore, it should be understood that, since the following embodiments disclosed in the Description and the constructions illustrated in the Drawings are provided by way of example and do not limit the scope of the present invention, a variety of equivalents and changes that can replace the following embodiments are possible at a time point when the present invention was applied.

A multistage control method of a flow rate control valve using a direct current (DC) motor according to an exemplary embodiment of the invention is a method of controlling the discharge flow rate of a flow rate control valve according to multiple stages using a flow rate control method of a DC motor. Here, the flow rate control method is a method to directly control the angular speed of the DC motor by setting the angular speed. Consequently, the flow rate is adjusted in response to the angular speed of the DC motor that is controlled via adjustment of the speed of a sleeve of the flow rate control valve. That is, it can be regarded that the angular speed of the DC motor indicates the speed at which the sleeve of the flow rate control valve is opened.

Here, the speed control method uses a gain scheduling method in which various gain components can be divided and applied in response to target values. When only results are compared, this method exhibits similar characteristics to the proportional control of a proportional integral derivative (PID) controller. This differs from the PID controller in that the actual angular speed value of the DC motor that is already known through calculation is divided into various gain components depending on the stages before being input.

Specifically, when the PID controller is used, a tuning procedure of trial and error must be executed so that the adjustment is made at a target time. However, the advantages of the speed control method according to an exemplary embodiment of the invention are that the angular speed depending on the stages that is to be input into the gain schedule can be simply set and the system can be operated without any additional tuning procedure.

Here, describing the tuning process of the PID controller, the PID controller primarily derives individual gain components through software modeling simulation, and undergoes a tuning procedure so that a target point is arrived at, without an overshoot or an undershoot, via trial and error, in order to derive the gain components. At this time, the tuning refers to a trial-and-error approach of a suitable PID controller for obtaining gain components.

Described in more detail, a test is executed by initially disposing a single piece, or a control valve, in a test device based on the derived proportional control gain components. However, since desirable control in an actual environment is not enabled when the gain components that have been derived by the simulation are used, fine tuning is executed again in a laboratory. That is, when a control valve which has a gain component determined in the laboratory is disposed in an actual system of a projectile, a retuning procedure must be executed.

However, in the multistage control method of a flow rate control valve using a DC motor according to an exemplary embodiment of the invention, the modeling simulation does not require an additional tuning procedure once the speed is set. This is because, unlike the PID controller which executes the setting using proportional, differential and integral functions, the unique speed components of the DC motor that are already known are directly set. Therefore, (although the problem regarding control over the overshoot or undershoot is not considered), since the PID is nonlinear even when the dynamic characteristic of the stroke of the control valve is viewed, variables are present that must be overcome in order to obtain suitable results. However, the speed control method of the DC motor does not have any variable.

FIG. 1 is a conceptual view showing the operation principle of the multistage control method of a flow rate control valve using a DC motor according to an exemplary embodiment of the invention. The transverse axes in FIG. 1 indicate reference lines of limit values SP1, SP2, SP3, SP4, . . . which are suitably set within the range in which neither the overshoot nor the undershoot occurs depending on the rotational characteristic of the DC motor. Individual angular speed limit areas depending on the stages are divided by the reference lines.

In addition, the curve in the graph indicates actual angular speed values of the DC motor that were measured using a drive voltage that is applied, the signs S1, S2, S3 and S4 indicate angular speed instructions that are respectively applied to the DC motor depending on the angular speed limit areas, and the signs $\alpha$, $\beta$, $\gamma$, $\delta$ and $\epsilon$ indicate the sizes of inclination of the angular speed values that are applied to the DC motor by the angular speed instructions depending on the limited areas. Here, the angular speed instructions indicate rotation control signals to the DC motor each of which causes the DC motor to be applied with a drive voltage that enables the DC motor to rotate at a corresponding angular speed.

As shown in FIG. 1, the multistage control method of a flow rate control valve using a DC motor according to an exemplary embodiment of the invention divides the angular speed limit areas of the DC motor depending on the stages based on a plurality of limit values SP1, SP2, SP3, SP4, . . . so that the angular speed values of the DC motor that are determined depending on drive voltages applied to the DC motor can be scheduled depending on the stages, and controls the DC motor to rotate at a determined angular speed value depending on a corresponding angular speed instruction Sn to the DC motor within one angular speed limit area. When the angular speed value of the DC motor is outside the range of a limit value SPn of the corresponding angular speed limit area, the DC motor is controlled so as to rotate at a determined angular speed value until reaching outside the range of a limit value SPn+1 of the corresponding limit area depending on a corresponding angular speed instruction Sn+1 to the DC motor within the angular speed limit area of the next stage.

Described in more detail, at an initial stage of the operation of the DC motor, a corresponding drive voltage is applied to the DC motor so that the motor rotates at an angular speed value having a predetermined size of inclination a depending on a first angular speed instruction S1. When the angular speed of the DC motor increases and becomes outside the range of the first limit value SP1, a corresponding drive voltage is applied to the DC motor so that the motor rotates at an angular speed having a predetermined size of inclination β depending on a corresponding second angular speed instruction S2 within a second angular speed limit area. Afterwards, when the angular speed value of the DC motor is outside the range of the second limit value SP2, a corresponding drive voltage is applied to the DC motor so that the motor rotates at an angular speed value having a predetermined size of inclination γ depending on a corresponding third angular speed instruction S3 within a third angular speed limit area. In this fashion, the angular speed of the DC motor is controlled depending on the stages.

Figure 2:
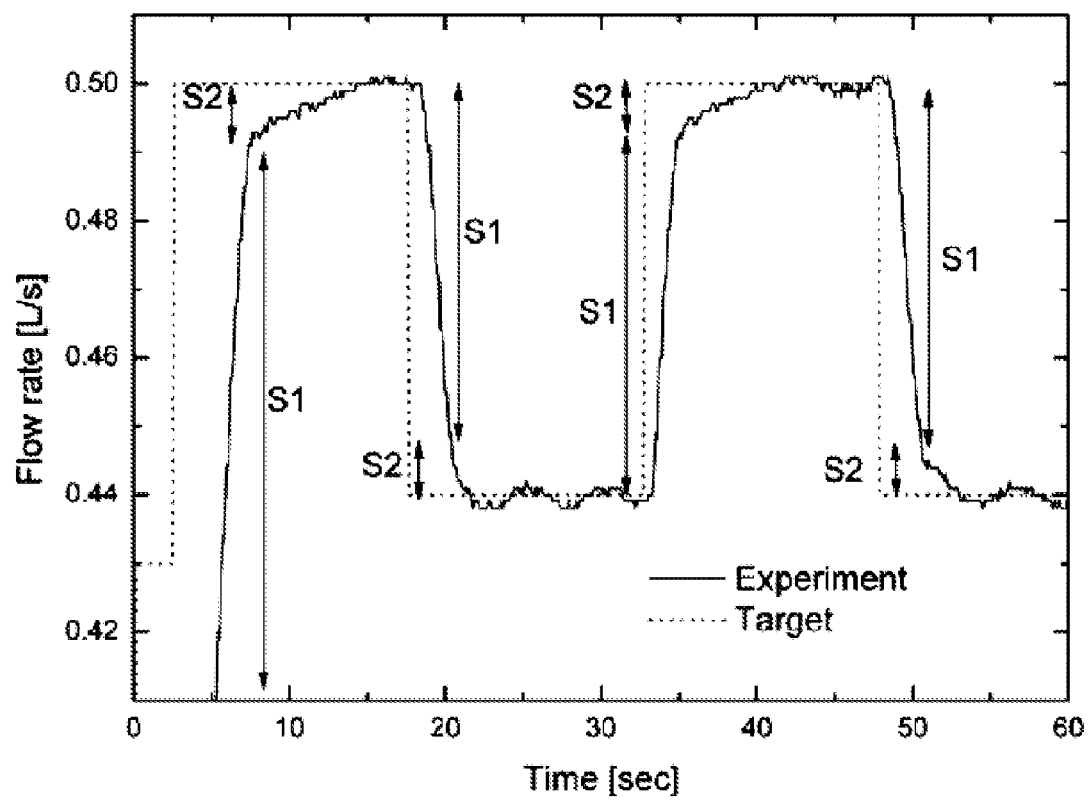
FIG. 2 is a graph showing measurements of flow control performance discriminated into two angular speed components by a multistage control method of a flow rate control valve using a DC motor according to an exemplary embodiment of the invention.

In addition, in the multistage control method of a flow rate control valve using a DC motor according to an exemplary embodiment of the invention, control over physical quantities refers to flow rate control inside a tube, in which the DC motor is restrained at different speeds (angular speed values) depending on the stages according to the set limit values of flow rates within the range in which neither an overshoot nor an undershoot occurs, by referring to the flow rates. Thus, the DC motor rotates at an intended angular speed to adjust the degree of opening of the flow rate control valve so that an intended flow rate is consequently obtained. That is, as shown in FIG. 1 and FIG. 2, the multistage control method of a flow rate control valve using a DC motor according to an exemplary embodiment of the invention is characterized in that a final target value SP$^\infty$ is tracked by repeating procedures of rapidly converging to SP1 as the inclination of S1 and rapidly converging to SP2 as the inclination of S2 at the stage of becoming outside the range of the limit value SP1. In particular, referring to FIG. 2, it can be appreciated that, when an intended limit value is set depending on two angular speed components and speed control is executed within a corresponding limit range, a target value is rapidly reached in the state in which an overshoot or an undershoot due to mechanical inertia of the DC motor or gears is avoided. If the limit value is set by dividing it into a plurality of values, a more suitable convergence result can be obtained.

According to the multistage control method of a flow rate control valve using a DC motor according to an exemplary embodiment of the invention as described above, suitable limit values are set depending on stages according to angular speed components of the DC motor depending on a drive voltage that is applied during angular speed control of the DC motor using a speed control method and the speed of the DC motor is controlled within a corresponding limit range. Consequently, it is possible to rapidly reach a target value without an overshoot or an undershoot, so that the DC motor can be rotated at an intended angular speed, thereby enabling the effect of precise flow rate control. In addition, there is an advantage in that the adjustment result is linear, since a one-directional instruction is given depending on the limit value of the angular speed of the DC motor.

In particular, since the maximum and minimum angular speeds can be set freely, it is possible to properly control the flow rate of an apparatus, such as a liquid rocket, the thrust of which must be changed to a low thrust level after being maintained at a constant level. In addition, when only one speed component (limit value) is applied, an overshoot or an undershoot may occur when the speed is abruptly reduced after propelling the liquid rocket at the maximum RPM. In contrast, when several speed components (limit values) depending on the stages are applied as described above, it is possible to smoothly reach the target value. That is, since the maximum and the minimum angular speeds can be freely set, it is possible to meet requirements for and be applied to liquid rockets in which the thrust may be changed to a low thrust level after being maintained at a constant thrust level.

Although some exemplary embodiments of the present invention have been described with reference to the drawings for illustrative purposes, those skilled in the art to which the present invention relates will appreciate that various modifications and variations are possible, without departing from the scope and spirit of the invention as disclosed in the accompanying claims.

The invention claimed is:

1. A multistage control method of a flow rate control valve which is opened or closed when a motor rotates so that a flow rate is adjusted, the multistage control method comprising:
    determining an operating range of angular speeds of the motor;
    dividing the operating range by stages into angular speed limit areas that are bounded by a plurality of permanently assigned limit values (SP0, SP1, SP2, SP3, SP4, . . . ) so that angular speed values of the motor are determined depending on motor drive voltages that are scheduled depending on the stages,
    generating angular speed instructions that correspond to respective stages;
    ascertaining a current angular speed of the motor; and
    controlling the motor to rotate at a predetermined angular speed value in response to an angular speed instruction (Sn) if the current angular speed is within the angular speed limit area bounded by adjacent limit values ($SP_{n-1}$) and ($SP_n$),
    wherein, when the current angular speed value is above the limit value ($SP_n$), the angular speed instruction is changed to ($SP_{n+1}$) so as to rotate the motor at another predetermined angular speed value until the motor reaches the limit value ($SP_{n+1}$), and
    wherein the speed limit area bounded by $SP_{n-1}$ and $SP_n$ is larger than the speed limit area bounded by $SP_n$ and $SP_{n+1}$ for integers n that are set within a range in which neither a substantial overshoot nor a substantial undershoot of the angular speed of the motor occurs.

2. The multistage control method of claim 1, wherein the motor is a direct current motor.

* * * * *